United States Patent
Buhrmann et al.

[11] Patent Number: 6,035,193
[45] Date of Patent: Mar. 7, 2000

[54] TELEPHONE SYSTEM HAVING LAND-LINE-SUPPORTED PRIVATE BASE STATION SWITCHABLE INTO CELLULAR NETWORK

[75] Inventors: Michael Buhrmann, Redmond; Ileana A. Leuca, Bellevue, both of Wash.

[73] Assignee: AT&T Wireless Services Inc., Redmond, Wash.

[21] Appl. No.: 08/671,745

[22] Filed: Jun. 28, 1996

[51] Int. Cl.[7] .............................. H04Q 7/20; H04Q 7/30
[52] U.S. Cl. ........................... 455/426; 455/445; 455/561
[58] Field of Search ..................... 455/552, 426, 455/561, 404, 444, 462, 445; 379/45, 49

[56] References Cited

U.S. PATENT DOCUMENTS

| | | |
|---|---|---|
| 4,989,230 | 1/1991 | Gillig et al. . |
| 5,127,042 | 6/1992 | Gillig et al. . |
| 5,177,780 | 1/1993 | Kasper et al. ............................ 455/413 |
| 5,311,570 | 5/1994 | Grimes et al. ............................ 455/555 |
| 5,353,331 | 10/1994 | Emery et al. . |
| 5,367,558 | 11/1994 | Gillig et al. ............................ 455/426 |
| 5,442,680 | 8/1995 | Schellinger et al. . |
| 5,463,674 | 10/1995 | Gillig et al. . |
| 5,469,496 | 11/1995 | Emery et al. . |
| 5,526,402 | 6/1996 | Dent et al. ............................... 455/552 |
| 5,542,100 | 7/1996 | Hatakeyama ............................ 455/404 |
| 5,594,782 | 1/1997 | Zicker et al. ............................ 455/426 |
| 5,659,598 | 8/1997 | Byrne et al. ............................. 455/426 |
| 5,678,188 | 10/1997 | Hisamura ................................ 455/462 |
| 5,724,647 | 3/1998 | Sato ........................................ 455/426 |
| 5,745,852 | 4/1998 | Khan et al. .............................. 455/445 |

OTHER PUBLICATIONS

Patent No. WO 95/24106 published on Sep. 8, 1995 to P. W. Dent and J. C. Haartsen (International Application published under PCT [PCT/US95/02020]). Int. Class: H04Q 7/24, 7/38. Translation: yes.

Patent No. EP 0 643 543 A, published by European Patent Office on Mar. 15, 1995 to Dr. M. Bohm. Int. Class: H04Q 7/24. Translation: no.

Patent No. EP 0 462 727 A, published by European Patent Office on Dec. 27, 1991 to R. Mauger, C. Field and A. J. Wilton. Int. Class: H04Q 7/04, H04B 7/26. Translation: yes.

*Primary Examiner*—Edward F. Urban

[57] ABSTRACT

A telephone system includes at least one mobile station for communicating with a wireless cellular phone network at a private base station that registers a mobile station and enables communication of a mobile station with a land-line telephone network through the private base station. The private base station is responsive to pre-determined signaling codes received from a registered mobile station for switching the communication of the private base station into the wireless cellular phone network. The private base station includes a memory for storing calling numbers received from a landline network. A dialer generates calls to a stored calling number through the wireless cellular network upon receipt of a pre-determined signal generated by a registered mobile station.

46 Claims, 5 Drawing Sheets

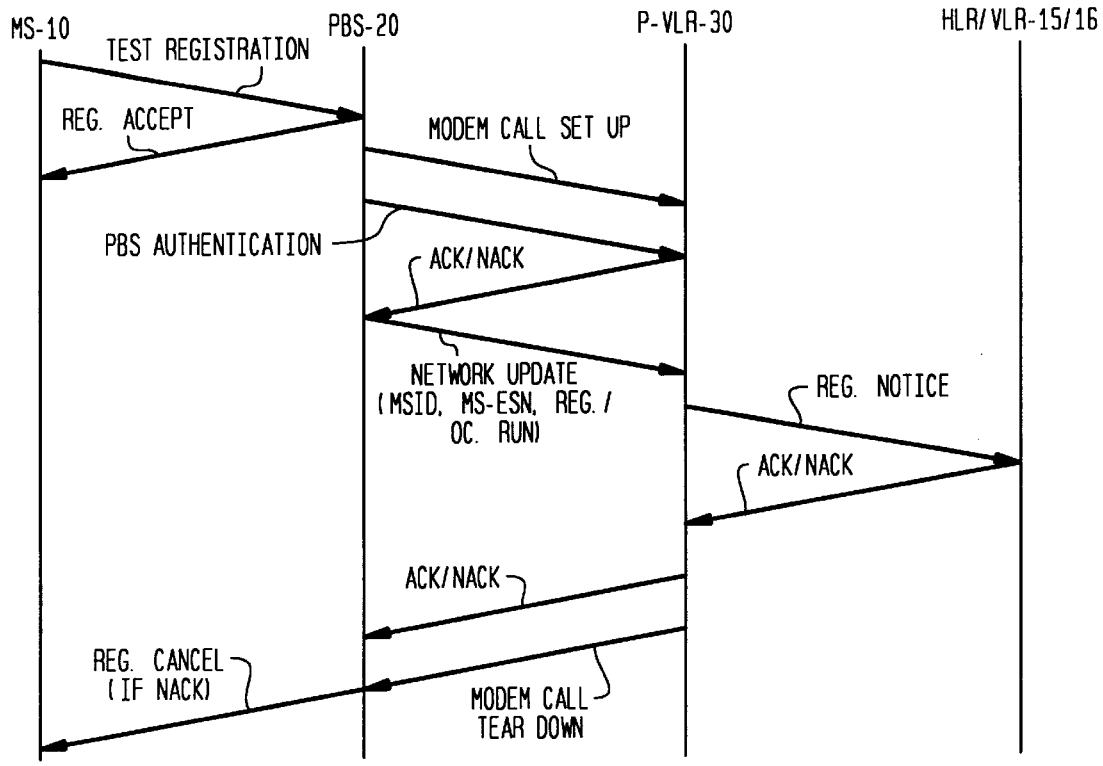
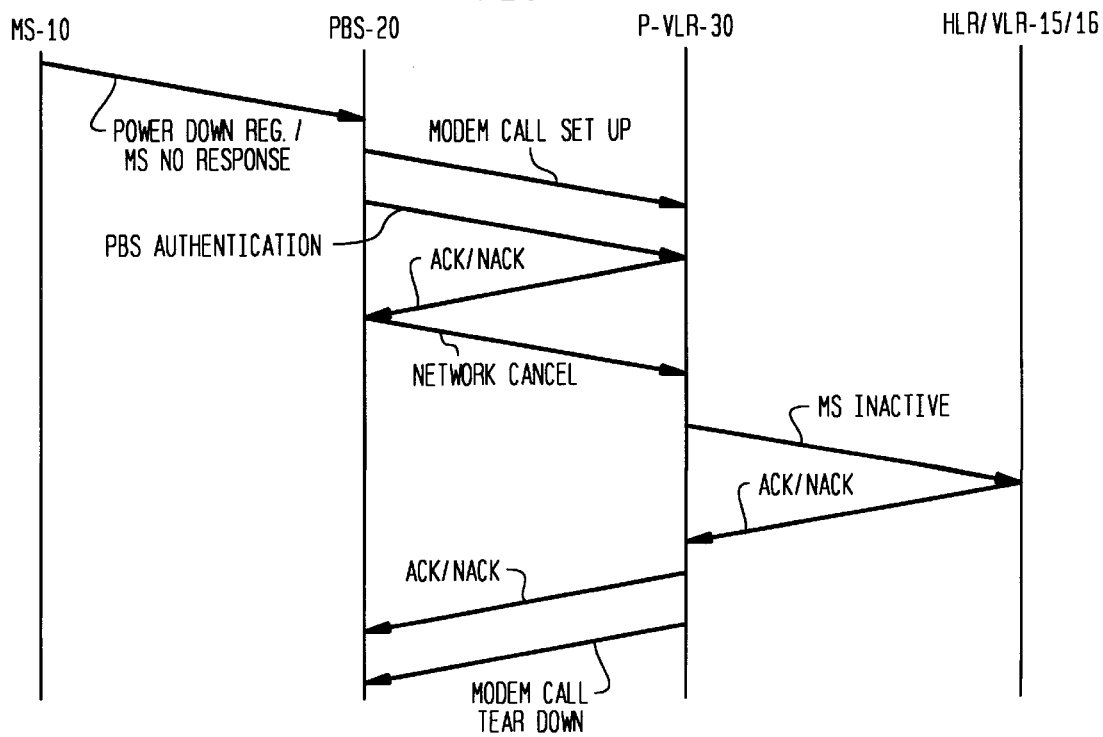

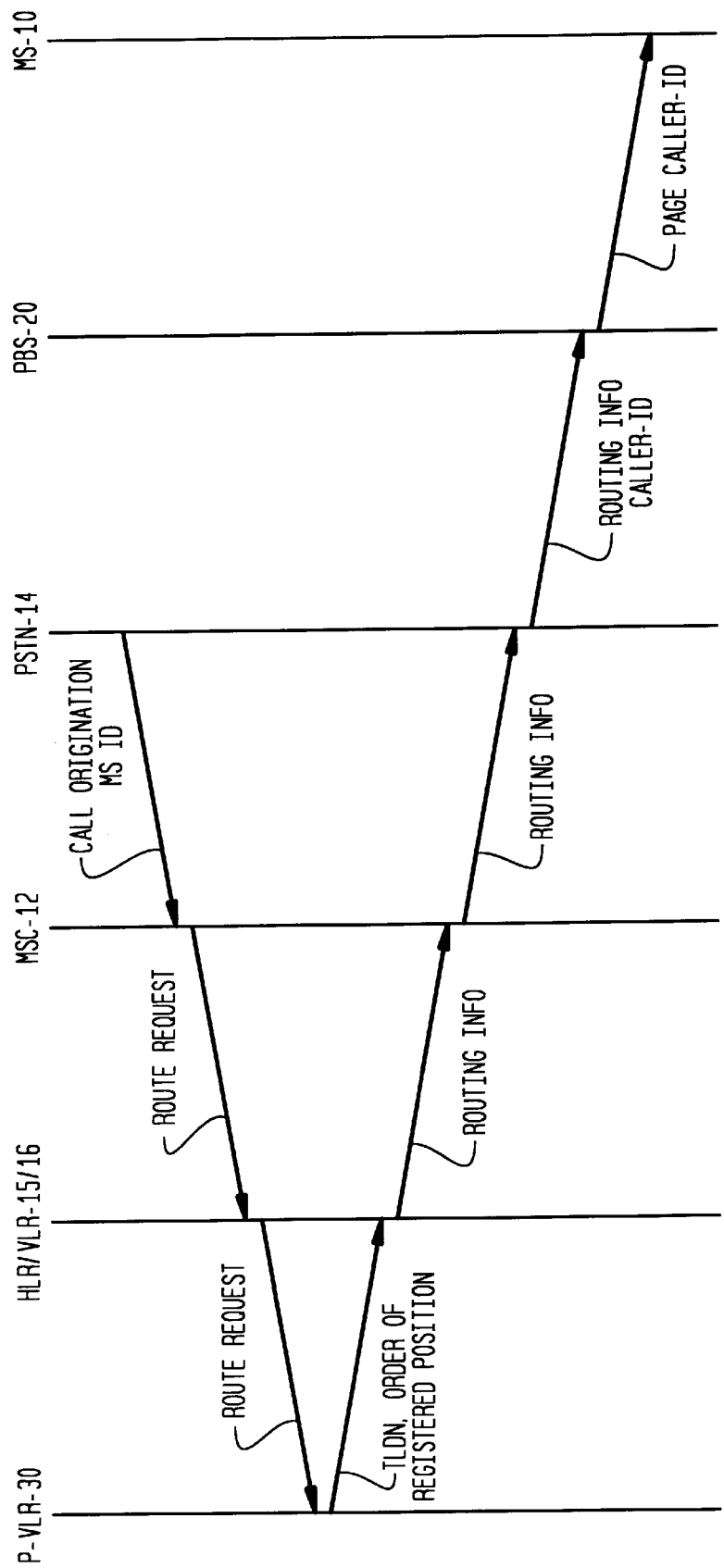

TELEPHONE SYSTEM HAVING LAND-LINE-SUPPORTED PRIVATE BASE STATION SWITCHABLE INTO CELLULAR NETWORK

FIELD OF THE INVENTION

This invention relates generally to wireless radio telephones and, more particularly, to wireless radio telephones operative with a landline supported private base station that can switch into communication with a cellular network.

BACKGROUND OF THE INVENTION

Modern cellular telephone systems currently utilize high power, frequency, time and/or code division multiplexed narrowband radio frequency communication techniques in conjunction with large cells to establish and maintain telephone communications. With the growing popularity of mobile stations configured for operating in these systems, increased flexibility in user utilization of these mobile stations is desired. One approach to providing user flexibility while encouraging greater utilization of the mobile stations is by providing low-power private base stations over which a user can register his or her mobile station and make and receive telephone calls. A private base station shares the same frequency bands with large cells, but operates at a greatly reduced power level. Also, each private base station has a landline subscriber telephone number through which all incoming and outgoing calls are routed.

Although systems employing private base stations currently exist that can support registration of multiple mobile stations, a call received at a private base station for any one of mobile stations registered with this base station causes all mobile stations registered with the base station to be similarly alerted. While this type of operation has been generally satisfactory in the past when the likelihood of only one or two mobile stations would be registered with a private base station at any given time, it is now technically feasible and desirable to provide a system for operation of a private base station which accommodates many more mobile stations and at the same time provides an alerting signal for a mobile station only when an incoming call is received for this station.

Some proposals for improved cellular communications disclose various cellular networks that work in association with a private base station. In U.S. Pat. Nos. 5,353,331 and 5,469,496, to Emery et al., the advanced intelligent network wireline system connects to and controls processing of calls to a service subscriber's wireless handset via a homebase station or a wireless communication network. The network uses data to route the call to a current location and provide instruction data to the landline network and/or a mobility controller and extend a request for special service to the calling subscriber.

In U.S. Pat. Nos. 5,127,042 and 5,463,674, to Gellig et al., when a cellular cordless telephone is within range of a cordless base station, telephone calls can be made over the cordless radio channel or transferred from the cellular radio channels to the cordless radio channel. Telephone calls may be made over the cellular radio channels or transferred from the cordless radio channel to one of the cellular telephone channels.

U.S. Pat. No. 5,442,680 to Schellinger, discloses a system that reduces the amount of time spent in monitoring a sub-data channel of limited coverage area with a personal base station. A signal is generated which represents the period of time spent monitoring the radio channel. An adjusted value of a monitoring time value is compared to a value of a timing signal, and when an adjusted monitoring time value equals or exceeds a timing signal value, the monitoring of the radio channel ceases.

Other proposals show various cellular and wireless communication systems using a private base station where various mobile stations can communicate with each other through the private base station, and where a plurality of base stations transmit distinctive identification signals.

None of these prior art proposals, however, allow signaling in the cellular network such as is common in the public-switched telephone network. Many of the special features available only through the local switch and via the wire-line public-switched telephone network are not available through the cellular network and through a private base station. To reform the cellular network to support the signaling would be expensive.

SUMMARY OF THE INVENTION

In accordance with the present invention, a residence or small business now supports a private base station and also supports signaling that bypasses the local switch and allows the manifest advantages of signaling in the cellular network such as accompanies the public-switched telephone network.

For example, a residential private base station can now collect and save data from incoming calls. A memory unit is dedicated to recording the calling party number (CPN) and then a separate dialer in the private base station generates the number through the cellular network after the residential private base station has been switched into the cellular network in response to a signaling code generated from a mobile phone registered with the private base station.

In accordance with the present invention, at least one mobile station communicates with a wireless cellular phone network. A private base station includes a system for registering a mobile station with the private base station and enabling communication of a mobile station with a landline telephone network through the private base station. The base station is responsive to predetermined signaling codes received from a registered mobile station for switching the communication of the private base station into the wireless cellular phone network. The private base station includes a memory unit for storing calling numbers received from a landline network. A dialer retrieves a stored calling number and generates calls through the wireless cellular network upon receipt of a pre-determined signal from a registered mobile station.

In another aspect of the invention, the private base station includes at least one stored emergency number that is dialed through the wireless cellular network upon receiving an emergency signal. The private base station also includes at least one stored emergency number that is dialed through the landline upon receiving an emergency signal. In either instance, an emergency push-button, located on either the mobile station or the private base station can be pushed for generating the emergency signal.

In still another aspect of the present invention, all calls made to the mobile station within the wireless cellular network can be redirected through the landline to the private base station.

BRIEF DESCRIPTION OF THE DRAWINGS

This invention and its mode of operation will be more clearly understood from the following detailed description when read with the appended drawings in which:

FIG. 5 shows a registration/network update process through which a mobile station gains access to a private base station, in accordance with the invention;

FIG. 6 shows a network cancellation process which details how a registration of a mobile station with a private base station is canceled, in accordance with the invention; and FIG. 7 shows a network process which provides an incoming call transaction flow for a mobile station with a private base station, in accordance with the invention.

Throughout the drawing, the same element when shown in more that one figure is designated by the same reference numeral.

DETAILED DESCRIPTION

Figure 1:
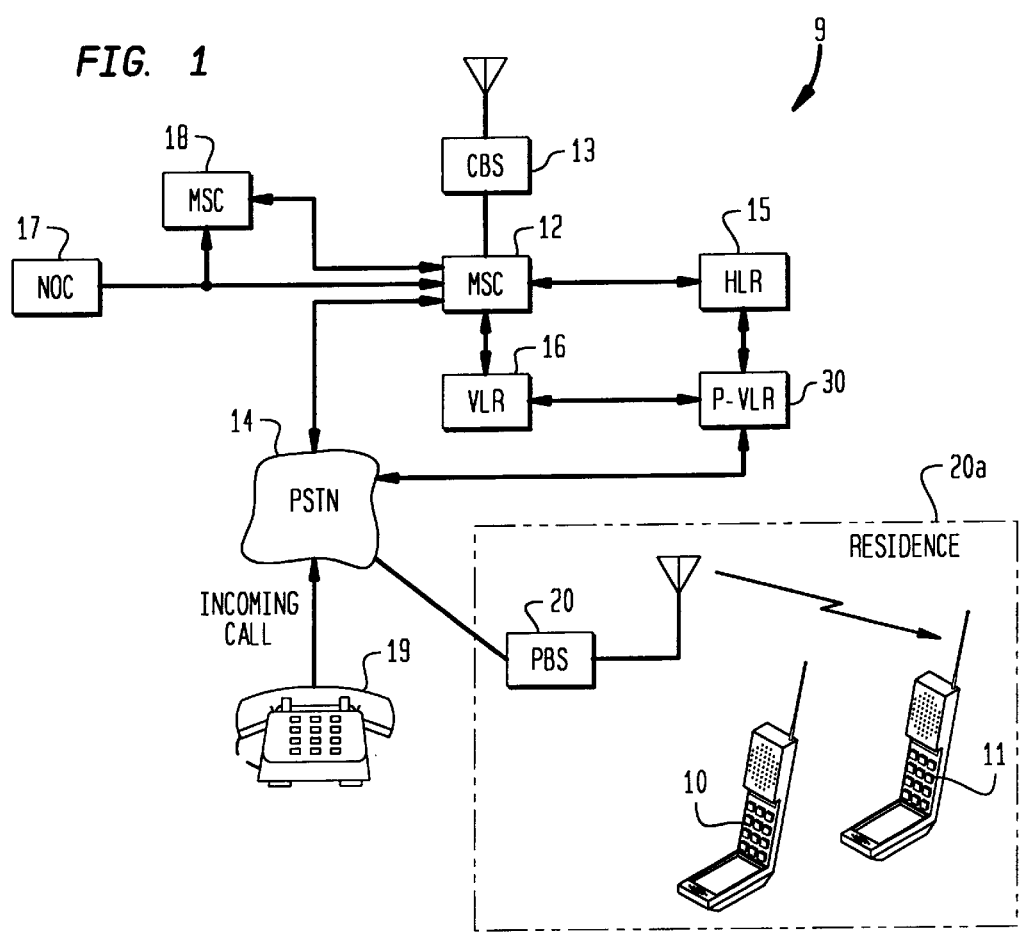
FIG. 1 shows a simplified block diagram of a cellular switching system, its logical entities as well as the relative connection with the public switched telephone network and a private base station.

Referring now to FIG. 1, there is shown a simplified block diagram of a cellular switching system forming part of a wireless cellular phone network illustrated generally at 9, its logical entities as well as the relative connection with the public switched telephone network and a private base station. The cellular concept is well known and is described in general in the *Bell System Technical Journal,* Volume 58, Number 1, January 1979, and specifically in an article entitled *The Cellular Concept* by V. H. MacDonald, on pages 15 through 41 of this journal, the disclosure which is hereby incorporated by reference.

Included within the cellular switching system are mobile stations (MS) 10 and 11, mobile switching center (MSC) 12, the public telephone switched network (PSTN) 14, a cellular base station (BCS) 13, a home location register (HLR) 15, a visiting location register (VLR) 16, a private base station visiting location register (P-VLR) 30, and a private base station (PBS) 20. A subscriber station telephone set 19 is illustratively shown connected to the public telephone switched network 14 in a well known manner. In this particular example, the private base station is illustrated as part of a residential premises 20a, shown with the dotted lines. Mobile stations 10 and 11 are shown contained in the residential premises.

For clarity, mobile switching center 12 is illustratively shown connected to mobile switching center 18 and network operation controller (NOC) 17. The mobile switching center 18 is part of the overall cellular systems operation and may similarly have a home location register, a visiting location register, a P-VLR, as well as multiple cellular base stations associated therewith. It is understood that other mobile switching centers also may be part of the cellular system. The network operation controller provides overall control and thereby ensures that the operation of the whole cellular system is supported and serviced.

The mobile stations 10 and 11 and base station 20 are designed to operate in a cellular system in accordance with the Telecommunications Industry Association MIA) Interim Standard (IS)-136, dated December 1994.

The mobile switching center 12 performs all the switching functions related to call delivery and is interconnected to the public telephone switched network 14, the home location register 15, the visiting location register 16 and the cellular base station 13.

The home location register 15 maintains a data base, profile record and call routing information or a pointer to the call routing information for all mobile stations in a particular assigned home area. The visiting location register 16 maintains a data base for call routing information or a pointer to the call routing information for those mobile stations which are visiting its assigned area of coverage.

The private base station visiting location register 30 performs the interface functions between a private base station, such as station 20, and both the home location register 15 and the visiting location register 16 for holding both call routing information and, order or registered position information for the mobile stations that are currently registered with the private base station. The private base station visiting location register 30 is also responsible for administering spectrum utilization and operations of the private base station 20.

The functions for the private base station visiting location register 30 may be conveniently summarized as follows:
1. Authorize new private base station operation.
2. Download private base station operating parameters and performs operation administration.
3. Authenticate all calls received from private base station.
4. Perform Registration Notification task to HLR/VLR when network update is received from private base station.
5. Perform mobile station inactive task to HLR/VLR when network cancellation is received from private base station.

The private base station 20 qualifies for private (or non-public) mode time-division-multiple-access (TDMA) cellular operation under IS-136 cellular radio interface, which permits a cellular mobile station to register with a private base station to receive or originate calls through a landline connected to the public telephone switched network instead of through a cellular base station, such as cellular base station 13, connected in the regular public cellular system. Specifically, this radio interface provides the digital control channel in accordance with TIA-IS-136.1 and the traffic channels and control channel in accordance with TIA IS-136.2 for communication with the mobile station. A modem interface between the private base station and the private base station visiting location register also is supported by the radio interface.

The private base station 20 is limited to a very low level of transmitted power of restricting its coverage range to a relative small area. This allows the private base station to reuse the same radio frequency spectrum used by the macro cellular systems as long as the frequency of use selected by the private base station is different from the cell for the regular public or macro cellular system in whose area of coverage the private base station is located. The operating frequency spectrum for the private base station is selected in a way that ensures no interference to the macro cellular system. This is achieved by directing the private base station to perform channel scanning and interference measurements before selecting its operating frequencies. While operating in its normal mode awaiting receipt of an incoming call or an off-hoke request from a registered mobile station, the private base station 20 continually broadcasts digital control channel information containing its identity and system parameters.

An IS-136 compliant mobile station can search for a private base station's control channel transmission using a number of techniques. One of these may be based on the mobile station's prior knowledge of the private base station's existence. Another may be in response to a mobile station user manually directing the mobile station to search for the private base station. In yet another technique the mobile station, upon finding the control channel of the private base station, automatically goes through a series of controlled procedures to obtain registration with the private base station.

Once a mobile station, for example, station 10 or 11, obtains a successful registration with the private base station 20, the private base station 20 makes a modem connection to the private base station visiting location register 30 to update the mobile station's temporary line dialing number (TLDN). The temporary line dialing number in this case will be the private base station's landline number (LLN). Hence, when an incoming call is directed to a particular mobile station, information including the temporary line dialing number for this mobile station is accessed from the private base station visiting location register 30 through the home location register 15 or the visiting location register 16 and the call routed to the private base station's LLN. It is also understood that the temporary line dialing number may be stored in either the home location register 15 or the visiting location register 16, and the mobile switching center 12 then accesses this TLDN from this register. The private base station 20 detects the ring for an incoming call and sends an alerting signal or page to the registered mobile station. Following the mobile station's response to the alerting signal, private base station 20 establishes a traffic channel for the mobile station and generates an off-hook condition to connect the incoming call through the private base station to the mobile station.

The private base station 20 supports the registering of multiple mobile stations and, in accordance with the disclosed embodiment, provides a personalized call delivery feature for each registered mobile station. In order to provide the personalized call delivery feature, during the TLDN update for the mobile station at the private base station visiting location register 30, additional information elements, i.e., digits, are added to the TLDN update for distinguishing a particular mobile station with the private base station 20. During the registration of a mobile station with the private base station, a local unique address is generated at the private base station. This local unique address may be either advantageously generated from the mobile station identification number contained in each mobile station or generated from an ordered position assigned by the private base station for each portable station registered with the private base station.

Thus by way of illustrative example of the operation of the ordered position registration, the mobile station that registers with the private base station 20 is inserted in registered position 1 by the private base station visiting location register 30, and the second mobile station is inserted in registered position 2 by the private base station visiting location register 30 and so forth. This ordered position information is advantageously treated as the local unique address or a sub-address by the private base station 20 for each mobile station registered with it. A distinct identity of binary digits for each mobile station distinguishing it from all other mobile stations registered with private base station 20 is obtained thereby.

The private base station receives the binary digits describing the order of registered position in the same manner as caller-ED delivery is achieved. The ordered position information is appended to the caller-ID message that accompanies an incoming ring signal or is appended to the time slot allocated for the caller-ID message when such message is not present. Switching offices that provide caller ID messages to a telephone station capable of decoding and storing the incoming telephone number are either shown or described in U.S. Pat. No. 4,277,649 which issued to D. Sheinbein on Jul. 7, 1981.

Knowing the order of registered position, the private base station along with the help of a mobile station user's profile stored in the private base station can support additional features like
1. Caller name display on the phone;
2. distinctive alerting;
3. Call blocking;
4. Incoming call log; and
4. Telephone answering device/message support.

Figure 2:
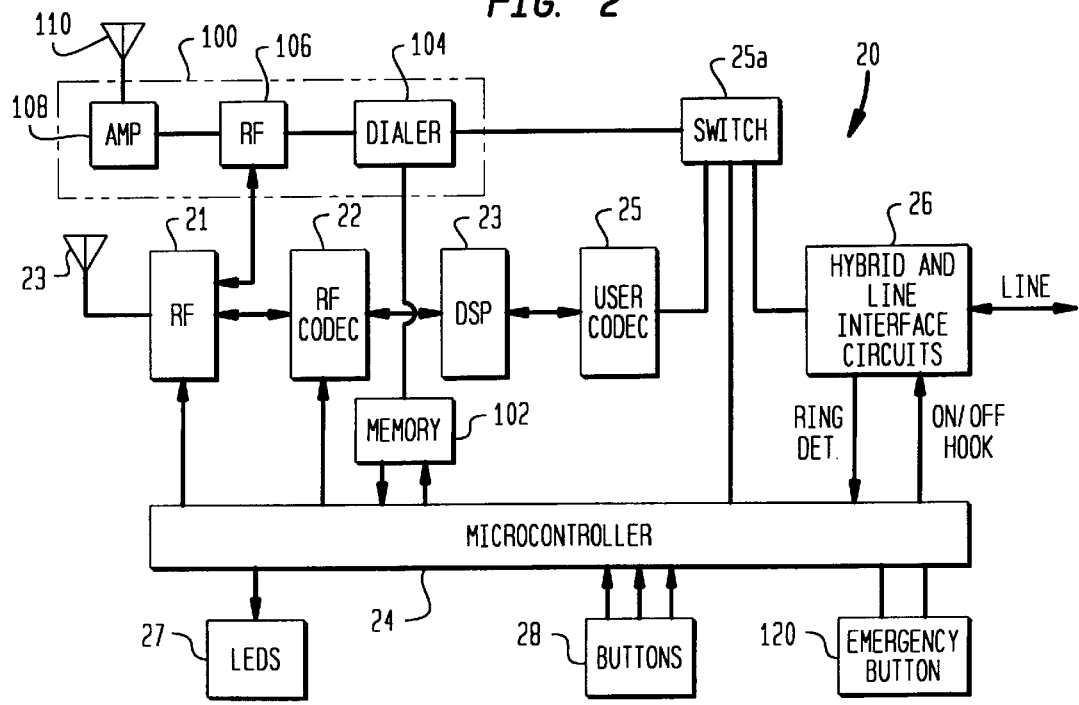
FIG. 2 shows a high level block diagram of a private base station separated into identifiable circuit sections.

Shown in FIG. 2 is a high-level block diagram of private base station 20 separated into identifiable circuit sections. A radio frequency (RF) circuit 21 performs the radio frequency signal processing. Included in this circuit is a radio frequency receiver section which receives the radio frequency signal from the mobile stations 10 and 11 and, after appropriate filtering and down conversion, produces I and Q signal for an RF CODEC 22 which is connected to the RF circuit 21. A radio frequency transmit section in RF circuit receives the I and Q signals from the RF CODEC 22, converts these signals to the appropriate radio frequency range and amplifies them for wireless transmission via antenna 23.

The RF CODEC 22 performs analog-to-digital (AID) conversion of the I and Q signals received in the receiver section of the RP circuit 21 and digital-to-analog (D/A) conversion of the I and Q signals provided to the transmitter section of the RF circuit 21. The RF CODEC 22 also performs modulation for the transmission path.

Connected to the RF CODEC 22 is a digital signal processor (DSP) 23 which performs all the baseband signal processing for the private base station applications. This involves speech encoding/decoding, time-division-multiple-access framing/deframing, channel encoding/decoding, and other modem functions such as, for example, automatic gain control, symbol timing recovery, synchronization, and the like. The DSP 23 also communicates with a microcontroller 24 for exchanging control messages. A user CODEC 25 performs conversion of digitally sampled speech signals to analog speech signals and also performs conversion of analog speech signals to digitally sampled speech signals.

Connected to the user CODEC 25 is a switch 25*a* used in the present invention for switching the private base station into communication with the wireless cellular network 9 for the landline PSTN 14. The switch 25*a* is connected to a second cellular circuit indicated generally by 100, and in parallel with RF unit 21 and a hybrid and line interface circuits interface section 26 which performs the required functions for interfacing the private base station 20 to the public switched telephone network 14. These include such functions and circuits as, for example, switch-hook operations, hybrid, ring detect, line termination, on/off hook signal interface signals and the like. The microcontroller 24 performs the call processing functions between the private base station 20 and any registered mobile stations as well as all other control functions that are required for operation of the private base station 20. LEDs 27 provide visual feedback to a user who makes entries at the private base station. Buttons 28 connect to the microcontroller 24 and are used in making the entries in the private base station 20. Once such entry, as described later herein, is that made by the primary user of the base station who direct this base station to register a mobile station for the first time.

As shown in FIG. 2, a memory unit 102 is connected to the microcontroller 24 and stores the calling numbers received from a landline network when a mobile unit is not able to accept a call. The memory unit 102 also can store emergency numbers, as well as software that can be used by the private base station microcontroller 24. The microcontroller 24 is programmed to work in conjunction with the memory unit 102 so that predefined signaling codes, similar to LASS features in a public network, can be generated by a mobile phone. In accordance with the present invention, the private base station receives signaling codes from the cellular phone to allow signaling functions.

As illustrated, the memory unit connects to the second cellular transceiver unit indicated by the dashed lines of 100 and, more particularly, to a dialer unit 104 that generates the calling number to a radio frequency transceiver unit 106, which connects into an amplifier 108 and second antenna 110. The second cellular transceiver unit 100 works closely in parallel to the RF unit 21 and is operatively connected thereto to work on similar frequencies. The second transceiver unit 100 allows greater power generation for operation with the cellular network 9.

Additionally, an emergency button 120, typically located on the private base station connects to the microcontroller so that upon depression of that emergency button 120, a stored emergency number is dialed and then sent to the cellular network 9.

The amplifier 108 provides the added power for the private base station to communicate with the cellular network. Additionally, the mobile units 10, 11 include emergency buttons 10a, 11a that upon their depression, activate the dialer 104 for generating a dialing sequence of emergency numbers stored within the memory unit 102.

The private base station can be designed so that it can be mobile and used as a cellular unit if an RJ-11 jack is not available for connecting the unit into the wired public-switch telephone network 14. The private base station can be programmed so that any stored emergency number can be dialed through the wireless cellular phone network upon receiving an emergency signal whether from the pushing of the emergency button on the mobile telephone or private base station. Additionally, the stored emergency number can be dialed through the land-line.

Figure 3:
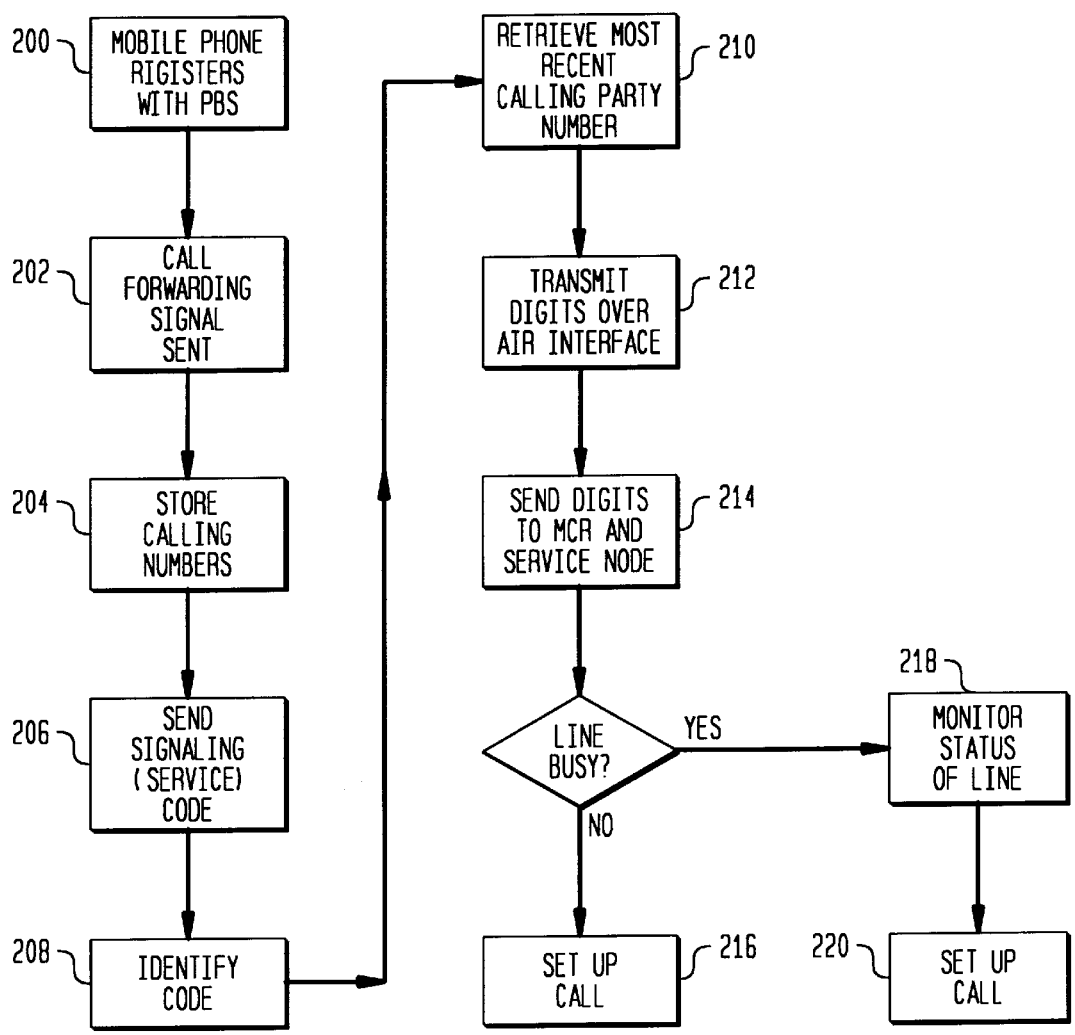
FIG. 3 shows a high level flow chart depicting one example of the invention in operation.

FIG. 3 illustrates a high level flow chart showing an example of the operation of the system.

When the mobile station 10 approaches the residential premises 20a containing the private base station 20, the mobile telephone 10 automatically registers with the private base station (Block 200). At the time of registration, a call-forwarding signal is sent from the private base station through the landline and to the cellular network requesting all cellular phone calls made to mobile station 10 to be delivered to the private base station via the land-line (Block 202).

During this time, the memory unit 102 stores various Calling Party Numbers (CPN) (Block 204). The mobile operator then activates a LASS feature, dialing a service code that is sent to the private base station, i.e., AUTO CALLBACK—STAR 69 (*69)(Block 206). The private base station identifies this service code (Block 208) and retrieves the most recent incoming calling party number (Block 210) and then sends those digits to the dialer unit 104 connected to the RF unit 106 and amp 108. The switch 25a is activated so that the second transceiver unit 100 transmits the digits over the air interface (Block 212). The network sends the signaling information (receive digits) to a MSC 12 and then to a service node (Block 214). The service node identifies a feature code and instructs the network to set up the call if the called party's line is idle (Block 216). If the called party's line is busy, the service node may instruct the network to monitor the status of the called party's line for a definite period of time (Block 218). As soon as this service node detects that the called party's line is idle, it instructs the network to set up the call through a normal call set up procedure through the wireless network (Block 220).

Additionally, the emergency buttons on either the private base station or mobile unit can be pushed to generate a signal.

It should be understood that the switching of the private base station into the cellular network upon receiving signaling codes will occur preferably when only one mobile station is registered with the private base station. However, the operation does not have to operate only in this fashion.

Figure 4:
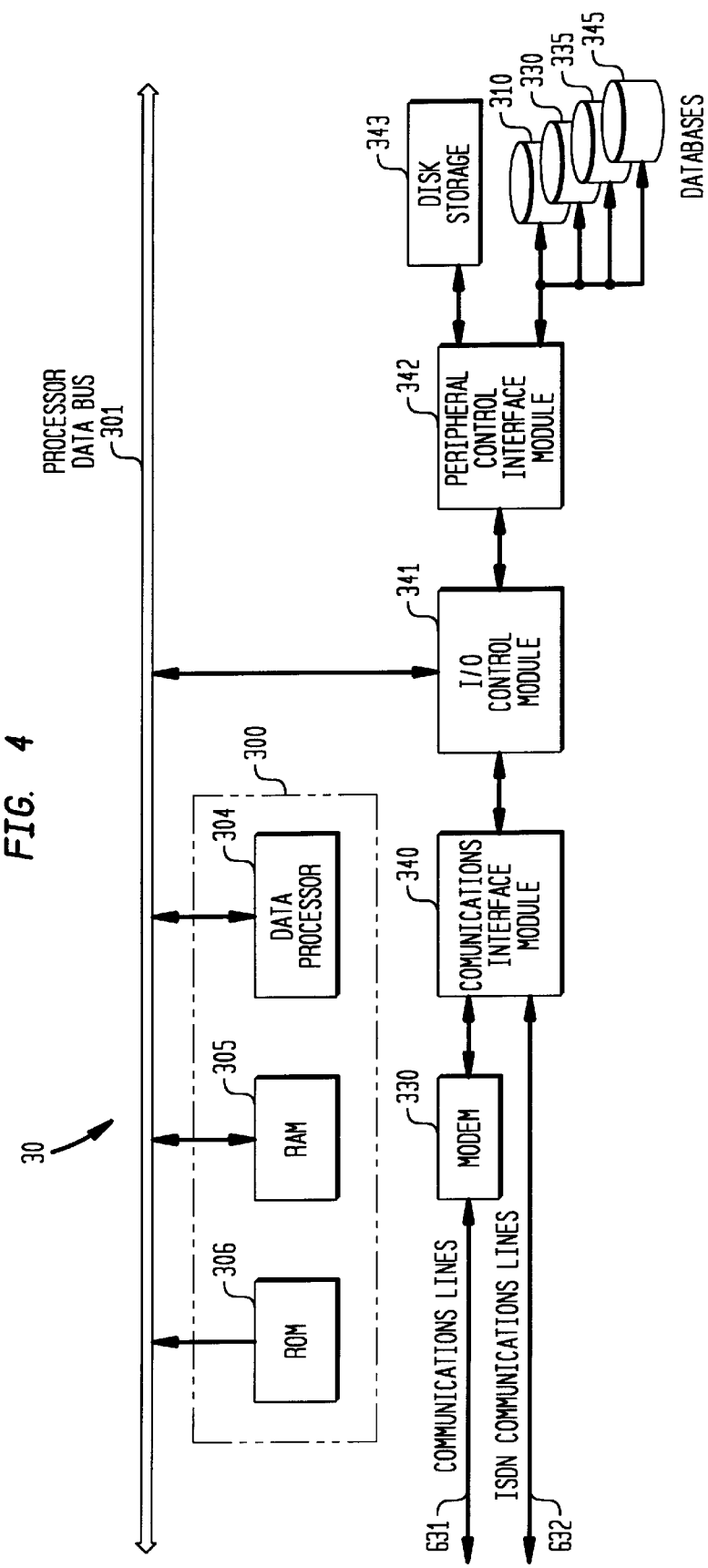
FIG. 4 shows a high level block diagram of a private base station visiting location register separated into identifiable circuit sections.

Referring now to FIG. 4 of the drawing, there is shown a general block diagram of a private base station visiting location register 30. This private base station visiting location register 30 may be geographically located away from or co-located with either a visiting location register or a home location register, with which it receives and provides private base station information. Moreover, the functions provided by the private base station visiting location register 30 also may be integrated into a visiting location register or a home location register, and such operation is hereby anticipated. The elements employed in the private base station register are computer 300, modem 330, control interface modules 340, 341 and 342, disk storage unit 343 and a plurality of databases 310, 330, 335 and 340.

The input to the private base station register 30 from a private base station, such as private base station 20, is provided over two-way communications lines 331 to the modem pool 330. The communications modem pool 330 typically provides data communication between multiple private base stations and the private base station visiting location register through the public telephone switched network. In providing this communication, any number of well known protocols that exists in the industry today may be used. By way of example, modem protocols such as V.22, V.22 bis or Bell 212 are all suitable for communications between the modem pool 330 and a private base station through the public telephone switched network. It is also possible to have a packet data protocol provide the two-way communications requirement. For example, an X.25 packet data protocol may be used in providing this communication.

Also connected to the communications interface module 340 are integrated services digital network (ISDN) communications lines 332. Although ISDN are shown, other lines may suitably be used in providing this communication, as well. The ISDN lines 332 are connected directly to the communications interface module 340 and enable the private base station visiting location register 30 to maintain communications between the home location register 15 and the visiting location register 16. Protocols that may be used in providing this ISDN communication may be, by way of example, either IS-41 or SS7 which are well-known in the industry.

The data signals received by modem pool 330 over both communications lines 331 and 332 are provided to a communications interface module 340. The data received by the interface module 340 is couple to the input/output control module 341 for processing by the computer 300 or for input to or accessing one or more of a series of databases, illustratively shown as database 310, 330, 335 and 345, as well as a disk storage medium 343, via the peripheral control interface module 342. The peripheral control interface module 342 interfaces the computer 300 and communications lines to the appropriate ones of the series of databases. or data files in accordance with the service or task being performed.

Each one of the series of databases 310, 330, 335 and 345 contain specific information. For example, the database 310 contains information of frequency allocations of surrounding cellular systems. Database 330 contains information of private base stations operating parameters determined by the private base station's location. Examples of a private base station operating parameters are its operating frequency, transmitted power, authorization time, and the like. Database 335 contains mobile station order of registered position information with the private base station and also private base station profiles. Examples of private base station profiles are "Call Waiting" and "Caller ID" that are provided by the public telephone switched network, and also any private base station location register 30. It is to be understood that other databases providing additional services or tasks also may be interfaced with the computer 300 via the peripheral control interface module 342.

Disk storage 343 contains operational information that is applicable to the cellular system in general, such as operation parameters that are required for interfacing the private base station visiting location register with home location register and visiting location register.

Contained in the computer 300 are a data processor 304, random access memory (RAM) 305 and read only memory (ROM) 306. This processor 304 responds to data input into input/output control mode 341. And with input from random access memory 305 and read only memory 306, processor 304 also provides the data to the processor bus 301 for facilitating data exchanges between the plurality of databases and the communications interface module 340 via the peripheral control interface module 342.

Referring next to FIG. 5, there is shown a registration/network update process though which a mobile station, such as mobile station 10, gains access to a private base station, such as private base station 20. The private base station initially authorizes the mobile station to obtain registration through it. After such initial authorization, the mobile station remains on the digital control channel. The private base station then seeks authorization for registration of the mobile station from the private base station visiting location register. The camping of the mobile station on the digital control channel can be terminated by the host private base station is proper authorization from the private base station visiting location is not obtained. During the registration process, the home location register 15 or visiting location register 16 is provided a call forwarding number from the private base station visiting location register (the private base station's LLN) for the mobile station.

There are two kinds of registration processes that take place between the mobile station and the private base station. One is the initial registration of the mobile station with the private base station. In this case, the private base station has no prior knowledge of the mobile station and will not accept its attempt to register unless the primary user of the private base station directs the private base station to do so. This acceptance process can be accomplished by the primary user pressing a registration button on the base station and then to prevent fraudulent registration, for example, entering a coded sequence of digits which only he or she knows. Once a mobile station obtains initial registration, it can automatically obtain subsequent registration with the private base station upon its arrival within the private base station's coverage area. Thus, this subsequent registration does not require intervention of the primary user of the private base station in any manner.

The registration process begins when an authorized mobile station sends a test registration (registration sequence) to the private base station. This registration/network update process is summarized below and also illustrated in FIG. 5.

1. The mobile station sends a test registration which includes the mobile station's identification (mobile station ID) and the mobile station's electronic serial number (ESN) to the private base station.
2. The private base station sends back a registration accept signal to the mobile station.
3. The private base station establishes a modem call to the P-VLR.
4. The private base station performs an authentication task to satisfy PVLR's requirements.
5. The P-VLR sends and acknowledge or negative acknowledge (ACKINACK) to the private base station in response.
6. Receipt of the NACK response cancels further transaction by the private base station and the mobile station registration attempt will be canceled.

Depending on the situation, the private base station may also be directed to shut down and retry registration at some subsequent time.

7. Following receipt of an ACK, the private base station performs a network update when the mobile station ID, mobile station ESN, land-line number as well as the order of registered position obtained for the mobile station are sent to the P-VLR. The order of registered position uniquely identifies the mobile station among other currently registered mobile stations within the private base station.
8. The P-VLR sends a Registration Notification to either the HLR or VLR. If the mobile station is in its home cellular coverage area, the notification will be directed to the HLR. Otherwise, the VLR will receive the notification. In the later case the HLR for the mobile station's home area will also be notified of the registration notification.
9. The HLR or VLR sends an ACK or NACK to the P-VLR. If an NACK is send, the denial could depend on a number of factors that depend on the service provider. For example, the provider may find that the mobile station does not have a valid service with it, or a second example could be that the mobile station does not have a valid mobile ID number, or it could be any other similar reason.
10. The P-VLR sends corresponding ACK or NACK to the private base station.
11. After receipt by the private base station of the ACK or the NACK, the modem call is terminated.
12. If an NACK is sent to the private base station by the P-VLR, the private base station sends a registration cancellation to the mobile station.

The first mobile station registered with the private base station in this process is allocated the position location number 1. The subsequent mobile stations registered with the private base station are given correspondingly increasing numbers. A private base station are given correspondingly increasing numbers. A private base station can typically support, by way of example, 10 such registrations, although more or less may be desired and the private base station suitably configured to accommodate different numbers. If a new mobile station registration request is properly received which exceeds the number then allocated for supporting registered mobile stations, the least used mobile registration number will be vacated to make room for the new one. Once registered, the mobile station does not need to re-register in this particular sense. Whenever the mobile station attempts to obtain subsequent registration for service with the private base station, the registration location number for the mobile station remains unchanged, assuming some minimal level of periodic use. During the process of subsequent service provision, the private base station always sends to the private base station visiting location register 30 the same registration location number for a particular mobile station. Also, it is understandable that the information exchange for a new mobile station registration will be much extensive when compared to its subsequent registration with the private base station.

Referring now to FIG. 6, there is shown a network cancellation process in which a preestablished and existing registration of a mobile station with a private base station is canceled or terminated. The network cancellation process begins when an authorieed mobile station moves out of the private base station's coverage area or the mobile station's power is turned off. When the mobile station moves out of the coverage area of the private base station, the resulting loss of communication from the mobile station is detected by the private base station. Also, when the mobile station's power is turned off, the mobile station performs power-down registration. When either of these two events occurs, the network cancellation process is executed by the private base station. Through this process, any cal forwarding to the private base station's land line number for the mobile station is cancelled. This network cancellation process is summarized below and also illustrated in FIG. 6.

1. The mobile station performs power-down registration.
2. The private base station establishes a modem call to the P-VLR.
3. The private base station performs an authentication task to satisfy the PVLR's requirements.
4. The P-VLR sends either an ACK or a NACK in response.
5. If the NACK response is received, the private base station cancels further transactions for this particular mobile station. The private base station also may be directed to shut down or to attempt a retry later at authentication.
6. If an ACK response is received, the private base station performs network cancellation by sending the mobile station ID and the mobile station ESN to cancel call forwarding of telephone calls to the mobile station which has either moved out of the coverage area or whose power is turned off.
7. The P-VLR sends a mobile station inactive signal to ELR/VLR.
8. The ELR/VLR then sends either an ACK or a NACK to the P-VLR.
9. The P-VLR sends a corresponding ACK or NACK to the private base station.
10. Followed by the sending of the ACK or NACK to the private base station, the modem call is terminated.

The user of a mobile station may elect to terminate communication with a private base station and reenter his or her mobile station into the cellular system. A mobile station may exercise this option, when, for example, service at the private base station is not available due to the single land line connection to the public telephone switched network being occupied by another mobile station communicating through the shared private base station.

A mobile station user may reenter the cellular system simply by, for example, pressing a cellular service button which executes a process wherein service with the private base station is terminated and service with the cellular service provider in the public cellular system is established. Once cellular service is established with, for example, cellular base station 13, shown in FIG. 6, a network update is performed by home location register 15 is the mobile station is located in its home coverage area or by visiting location register 16 if the mobile station is outside its home coverage area. Next, either home location register 15 or visiting location register 16 informs private base station visiting location register 30 that the identified mobile station has returned to the cellular system. The private base station visiting location register 30 then stores a mobile station inactive signal for the identified mobile station effectively inactivating or cancelling its call forwarding information.

Once the land line between the private base station 20 and the public telephone switched network 14 becomes available, the network cancellation process described in FIG. 6 is attempted by the private base station. since call forwarding for the identified mobile station has already been cancelled in the private base station visiting location register 30, in this instance by the mobile station reentering the cellular system, executing this process only confirms that the mobile station is presently not active with the private base station 20.

Referring next to FIG. 7, there is shown a network process which provides an incoming call transaction flow for a mobile station registered with a private base station. All incoming calls for each one of the mobile stations registered with the private base station will be routed to the private base station's landline number. The call transaction flow is summarized below and with reference to FIG. 7.

1. A call origination and the dialed mobile station ID are received from the public switched telephone network and routed to the MSC. Alternatively, the MSC may receive the call origination and the dialed mobile station ID from the cellular base station 13 in the public cellular system.
2. The MSC sends a route request to the mobile station's HLR (or to the VLR when the mobile station is a visiting station).
3. The HLR forwards the Route Request to the corresponding P-VLR which contains the registration information for the mobile station.
4. The P-VLR, returns the TLDN as well as the order of registered position to the HLR (or to the VLR when the mobile station is a visiting station) as part of the routing information. In this case, the order of registered position is defined as a sub-address for the mobile station.
5. The HLR adds mobile station ID and mobile station ESN to the routing information and returns the location request to the MSC which, in turn, forwards this information to the PSTN.
6. The call is delivered by the PSTN, which may include caller ID, to the LLN, the sub-address containing order of registered position is also sent along with the caller ID to the private base station. The private base station then sends a page to the mobile station along with the caller ID. The paged mobile station is the one which corresponds to the order of registered position.

Based on obtaining an order of registered position for each of the mobile stations, the private base station is able to advantageously offer various intelligent features which are personaled according to customer needs. For example, a calling party may have his or her name displayed on the mobile station for the convenient of the user at the mobile station.

The user of a registered mobile station is provided with a separate memory space allocated at the private base station to store a directory of phone numbers with names respectively associated with the telephone numbers. Upon receiving an incoming call for a particular mobile station (distinguished by the order of registered position), a calling party having a number that matches with one of the stored numbers in the directory will have his or her name sent to the mobile station by the private base station for display instead of the telephone phone number.

The private base station is able to provide distinctive alerting for a registered mobile station. The user of a registered mobile station can have, for example, a distinctive ringing sound (chosen from a group of ring sounds) associated with a particular calling party stored in his or her directory. Distinctive ringing is illustratively described in U.S. Pat. No. 4,995,075. When an incoming call is from the particular calling party, the private base station is able alert the mobile station using the distinct ringing sound.

The private base station is also able to provide a number of other advantageous functions based on obtaining an order of registered position for each of mobile stations. Features such as call blocking, an incoming call log, such as described in U.S. Pat. No. 5,386,460, and a telephone answering function with personalized mailboxes are easily provided. For call blocking, the user has a choice of blocking an incoming call which number matches one of specified numbers stored in the directory. The incoming call log is advantageously provided in the private base station for each of the registered mobile station users. And the private base station allows personalized greetings to be stored in a mailbox for each of the registered mobile stations. When an incoming call is directed to a particular mobile station and the user of this station does not respond, this personalized greeting is played to the calling party by the private base station.

What has been described is merely illustrative of the present invention. Other applications to wireless telephones, computer or other communication systems other than the disclosed system are contemplated as being within the knowledge of one skilled in the art and may be utilized without departing from the spirit and scope of the present invention.

That which is claimed is:

1. A telephone system comprising:
   at least one mobile station for communicating with a cellular phone network,
   a private base station, including means for registering the at least one mobile station with said private base station and enabling communication of the mobile station with a land-line telephone network through said private base station, and
   means responsive to predetermined signalling codes of the land-line telephone network not recognized by the cellular phone network, the predetermined signalling codes being received from the registered mobile station, for retrieving information stored in the private base station and converting the retrieved information for presentation to the cellular shone network.

2. The telephone system according to claim 1 wherein said private base station includes a memory for storing calling numbers received from a land-line network, and a dialer for generating calls to a stored calling number through the wireless cellular phone network upon receipt of a predetermined signal from a registered mobile station.

3. The telephone system according to claim 1 wherein said private base station includes at least one stored emergency number that is dialed through the wireless cellular phone network upon receiving an emergency signal.

4. The telephone system according to claims 3 wherein said mobile station includes an emergency push button for generating said emergency signal.

5. The telephone system according to claims 3 wherein said private base station includes an emergency push button for generating said emergency signal.

6. The telephone system according to claim 3 wherein said private base station switches said call into the landline network if a connection through the wireless cellular network cannot be established.

7. The telephone system according to claim 1 wherein said private base station includes at least one stored emergency number that is dialed through the landline upon receiving an emergency signal.

8. The telephone system according to claim 4 wherein said private base station switches said call into the wireless cellular phone network if a connection through the landline network cannot be established.

9. A telephone system according to claim 1, wherein the service node is located outside of a mobile switching center.

10. A telephone system comprising:
    at least one mobile station for communicating with a cellular phone network,
    a private base station operable with a land-line telephone network and the cellular phone network, including means for registering the at least one mobile station with said private base station and enabling communication of the mobile station with the land-line telephone network through said private base station, and means for generating and forwarding a redirection signal through the land-line telephone network and to the cellular phone network in communication with the land-line telephone network upon registration of the mobile station so as to redirect all calls made to the mobile station within the cellular phone network through the land-line telephone network to the private base station, and means responsive to predetermined signalling codes of the land-line telephone network not recognized by the cellular phone network, the predetermined signalling codes being received from the registered mobile station, for switching communication from the private base station into the cellular phone network.

11. The telephone system according to claim 9 wherein said private base station includes a memory for storing calling numbers received from the landline network, and a dialer for generating calls to a stored calling number through the wireless cellular phone network upon receipt of a predetermined signal from a registered mobile station.

12. The telephone system according to claim 10 wherein said private base station includes at least one stored emergency number that is dialed through the wireless cellular phone network upon receiving an emergency signal.

13. The telephone system according to claims 12 wherein said mobile station includes an emergency push button for generating said emergency signal.

14. The telephone system according to claims 12 wherein said private base station includes an emergency push button for generating said emergency signal.

15. The telephone system according to claims 12 wherein said private base station switches said call into the landline network if a connection through the wireless cellular phone network cannot be established.

16. The telephone system according to claim 10 wherein said private base station includes at least one stored emergency number that is dialed through the landline upon receiving an emergency signal.

17. The telephone system according to claim 16 wherein said private base station switches said call into the wireless cellular phone network if a connection through the landline network cannot be established.

18. A method of enabling communication between a cellular phone network and a private base station comprising the steps of:

switching the communication of the private base station into the cellular phone network after receiving predetermined signalling codes of a land-line telephone network not recognized by the cellular phone network from a mobile station that is registered with the private base station, the private base station being operable with the land-line telephone network and the cellular phone network, retrieving information stored in the private base station in response to the received predetermined signalling codes, and converting the retrieved information for presentation to the cellular phone network.

19. A method according to claim 18 including storing calling numbers within the private base station that had been received from a land-line network, and generating calls to a stored calling number through the wireless cellular phone network after receiving a predetermined signal from a registered mobile station.

20. A method according to claim 18 including the step of dialing an emergency number stored in the private base station through the wireless phone network upon receiving an emergency signal.

21. A method according to claims 20 including dialing an emergency number after an emergency push button located on a registered mobile station has been pushed.

22. A method according to claims 20 including dialing an emergency number after an emergency push button located on the private base station has been pushed.

23. A method according to claim 20 including the step of switching a call into a landline telephone network if a connection through the wireless cellular phone network cannot be established.

24. A method according to claim 18 including the step of dialing an emergency number stored in the private base station through the land-line telephone network upon receiving an emergency signal.

25. A method according to claim 24 including the step of switching a call into the wireless cellular phone network if a connection through the landline telephone network cannot be established.

26. A method according to claim 18, wherein the service node is located outside of a mobile switching center.

27. A method of enabling communication between a wireless cellular phone network and a private base station comprising the steps of:

registering a mobile station with a private base station so that the mobile station communicates with a land-line telephone network via the private base station, the private base station being operable with a land-line telephone network and the wireless cellular phone network, generating and forwarding a redirection signal through the land-line telephone network to the wireless cellular phone network in communication with the land-line telephone network after the mobile station has registered, redirecting all phone calls made to the mobile station within the wireless cellular phone network through the land-line telephone network to the private base station in response to the redirection signal, and switching the communication of the private base station into the wireless cellular phone network after receiving predetermined signalling codes of the land-line telephone network not recognized by the wireless cellular phone network from the registered mobile station.

28. A method according to claim 27 including storing calling numbers within the private base station that had been received from a landline telephone network, and generating calls to a stored calling number through the wireless cellular phone network after receiving a predetermined signal from a registered mobile station.

29. A method according to claim 27 including the step of dialing an emergency number stored in the private base station through the wireless cellular phone network upon receiving an emergency signal.

30. A method according to claims 29 including dialing an emergency number after an emergency push button located on a registered mobile station has been pushed.

31. A method according to claims 29 including dialing an emergency number after an emergency push button located on the private base station has been pushed.

32. A method according to claim 29 including the step of switching a call into a land-line telephone network if a connection through the wireless cellular phone network cannot be established.

33. A method according to claim 29 including the step of dialing an emergency number stored in the private base station through the landline telephone network upon receiving an emergency signal.

34. A method according to claim 33 including the step of switching a call into the wireless cellular phone network if a connection through the landline telephone network cannot be established.

35. A method of enabling communication with a cellular phone network and a private base station comprising the steps of:

receiving within the private base station predetermined signalling codes of a land-line telephone network not recognized by the cellular phone network from a registered mobile station, the private base station being operable with the land-line telephone network and the cellular phone network retrieving signalling information stored in the private base station in response to the predetermined signalling codes, converting the retrieved information for presentation to the cellular phone network, and receiving within the cellular phone network the converted information.

36. A method according to claim 35 including the step of generating calls to the private base station from a phone network for subsequent storage of the calling number within the private base station.

37. A method according to claim 36 including the step of receiving calls within a wireless cellular phone network that have been generated from calling numbers stored within the private base station.

38. A method according to claim 35 including receiving a dialed emergency number within the wireless cellular phone network after an emergency button has been depressed on the private base station or on a mobile station registered with the private base station.

39. A method according to claim 35 including receiving a dialed emergency number within the landline telephone network after an emergency button has been depressed on the private base station or on a mobile station registered with the private base station.

40. A method according to claim 35 including redirecting all calls generated to a mobile station within the cellular phone network through a landline phone network to a private base station after receiving a redirection signal from the private base station.

41. A method according to claim 38, wherein the service node is located outside of a mobile switching center.

42. A private base station operative with a cellular mobile station comprising:

an interface for connecting to a land-line telephone network and enabling communication of the mobile station with the land-line telephone network through the private base station, and a switch for switching communication of the private base station into a cellular phone network from the land-line telephone network after having received predetermined signalling codes from the mobile station that is registered with the private base station, the predetermined signalling codes being initiated by a user of the mobile station wherein the predetermined signalling codes are of the land-line telephone network and are not recognized by the cellular phone network, and the private base station is operative with the land-line telephone network and the cellular phone network to receive the predetermined signalling codes and to establish communication between the cellular phone network and the registered mobile station in response to the predetermined signalling codes.

43. A private base station according to claim 42 including a storage unit for storing calling numbers that have been received within the private base station.

44. A private base station according to claim 42 including a storage unit for storing at least one emergency number.

45. A private base station according to claim 44 wherein said private base station includes an emergency button, wherein upon depression of the emergency button the stored emergency number is dialed.

46. A private base station coupled with a land-line telephone network comprising:

a first transceiver unit for communicating with a registered mobile station;

a switch for switching connection of the private base station into a cellular phone network after having received predetermined signalling codes of the land-line telephone network that are not recognized by the cellular phone network from the registered mobile station, the predetermined signalling codes being initiated by a user of the mobile station; and a second transceiver unit for communicating with the cellular phone network.

* * * * *